H. R. CONKLIN.
SETTLING TANK.
APPLICATION FILED NOV. 22, 1915.
1,175,126.
Patented Mar. 14, 1916.
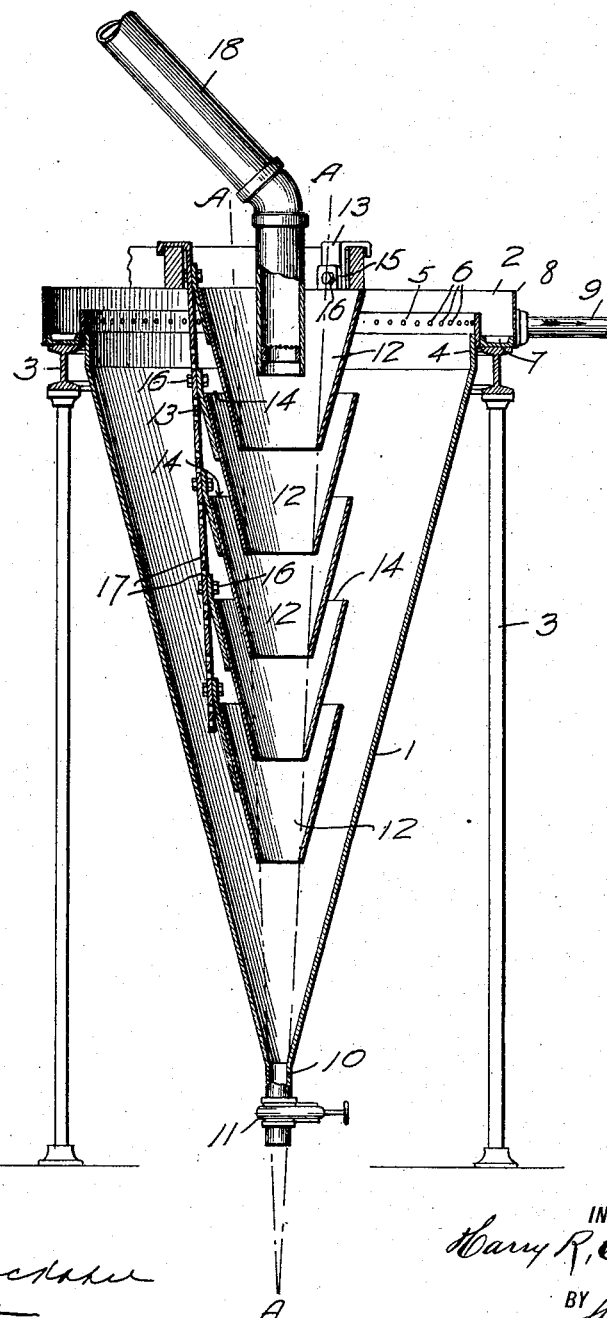

UNITED STATES PATENT OFFICE.

HARRY R. CONKLIN, OF JOPLIN, MISSOURI.

SETTLING-TANK.

1,175,126.  Specification of Letters Patent.  Patented Mar. 14, 1916.

Application filed November 22, 1915. Serial No. 62,792.

*To all whom it may concern:*

Be it known that I, HARRY R. CONKLIN, a citizen of the United States of America, residing at Joplin, in the county of Jasper and State of Missouri, have invented certain new and useful Improvements in Settling-Tanks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to settling tanks for settling the slimes from the solutions obtained in the cyanid method of recovering metals, and for other similar decanting processes.

The invention resides in the novel arrangement of parts, but more especially in the directing tube and in the relation of said directing tube to the tank, so as to obtain a rapid settling and a good separation of the solids from the liquid, thereby enabling either a larger quantity of solution to be handled in a given size of tank in a unit of time, or enabling the use of a smaller tank for handling the same quantity of solution in the same time as in the present day operations.

In the accompanying drawing I have shown a conical settling tank, having a launder 2 surrounding the top. The launder 2 is supported on suitable structural work 3 and supports the tank.

The top of the conical tank is here shown as cylindrical at 4, and is either secured to the launder 2, as shown, or itself forms the inner wall of the launder.

The launder 2, as illustrated, is composed of a short inner wall 5, having perforations 6 therein. This wall is secured to the inner flange of a rolled channel iron 7 which is bent into ring shape. The inner launder wall 5, or the cylindrical portion 4 of the tank, as the case may be, is riveted or otherwise secured to the inner flange of the channel iron 7.

The channel iron as shown is inverted, so that its flat side is underneath, to provide a proper and ready supporting surface on the framework 3.

The outer wall 8 of the launder is higher than the inner wall 5 and is secured to the outer flange of the channel iron 7 in any well known manner, as by rivets, and is provided with a discharge pipe 9.

The lower end of the tank 1 is provided with a preferably cylindrical short discharge tube 10, in which is inserted a gate valve 11, or equivalent device, for discharging the solids from the tank.

It should be noted that the sides of the tank 1 are steep, and the inclination is so chosen as to permit a minimum amount of solids to settle on the sides of the tank, and to facilitate their discharge. The slope of the sides will vary somewhat, according to the nature of the slimes, but I have found that a slope in the neighborhood of 70° will give the most satisfactory results with the usual character of slimes.

Extending centrally into the tank 1, and reaching near the bottom thereof is the directing tube for the incoming solution mixture. This tube consists of a plurality of inverted cones 12, maintained spaced apart by a number of suspending irons 13.

For small tanks and correspondingly sized directing tubes, the number of suspensions 13 may be three, but for large tanks of twenty feet or more diameter, the number of suspensions is increased to four or over.

The small, downwardly directed end of each cone 12 projects into the next succeeding cone. The smaller ends of the cones, preferably but not necessarily decrease in diameter from the top cone downward, and present a straight conical settling passage through the middle of the directing tube, as indicated by the dotted lines A—A to the discharge end 10 of the tank.

The upper, larger diameters of the cones 12, preferably but not necessarily, also decrease in diameter from the top downward, while the radii of the annular passages 14 between succeeding cones is preferably substantially the same, so that the areas of the passages 14 will preferably decrease from the top downward. In the same manner the annular spaces between the outer edges of the cones and the sides of the tank 1 decrease in area from the top downward. Each cone is provided with short pieces of iron 15 constituting ears or equivalents, through which pass bolts 16 for connecting the cones, in spaced relation, to the suspensions 13. These suspensions may have a series of holes 17, whereby the cones may be adjusted on the suspensions closer together or farther apart. By this means the areas of the annular passages can be varied at will, so that these areas instead of decreasing downward are the same, or are otherwise changed to meet conditions. The solution to be clarified, such as the cyanid solution mixture as it comes from the crushing apparatus or the agitators is supplied by a pipe 18 to the upper cone 12.

In operation the gate valve 11 is closed, solution is supplied to the composite directing tube by the pipe 18, the tank fills, the solids descends through the conical path between the dotted lines A—A to the bottom of the tank. As the solids descend and settle, the separated solution escapes upwardly between the cones through the areas 14; the solids become thicker and thicker correspondingly decreasing in volume as they descend. The solutions from the thickened portions in the lower cones are less in proportion than those in the upper cones and they have a smaller area 14 to pass through. These areas 14 are under successively increasing pressures, due to increased hydraulic head, and the solutions escaping from the lower areas have an increased distance to pass through to the overflow openings 6 from the tank to the launder. The solutions as they pass up between the cones and steep sides of the tank pass through zones of gradually enlarging cross section, formed by the difference in slope of the tank walls and the general slope of the composite directing tube, whereby their velocities are decreased and the settling of the solids facilitated.

I claim:

1. The combination with a conical settling tank having a bottom discharge, of a directing tube in said tank consisting of a series of spaced cones whose discharge orifices decrease in diameter.

2. The combination with a conical settling tank having a bottom discharge, of a directing tube in said tank consisting of a series of spaced cones whose upper larger diameters and whose lower smaller diameters successively decrease downward.

3. A directing tube for settling tanks, comprising a series of vertical spaced cones successively decreasing in size having their discharge orifices also decreasing in size and connected together to form a unit.

4. A directing tube for settling tanks, comprising a series of spaced cones of the same vertical height but decreasing both in major and minor diameters, and connected together to form a unit.

5. A directing tube comprising downwardly directed spaced cones, means connecting the cones together to hold them in spaced relation and to maintain decreasing cross sectional areas for the liquid flow through the interspaces between the walls of the successive cones at different levels.

6. The combination with a conical settling tank, a series of spaced cones in said tank successively projecting into one another and successively decreasing in size, said cones arranged with respect to one another and to the tank to provide a decreasing passage for solids through the cones to the bottom of the tank to provide interspaces between the successive cones successively decreasing in area and to provide an increasing space between the cones and the tank in the direction of flow of the clarified liquid.

7. A directing tube for settling tanks comprising a series of spaced cones connected together to form a unit and means to adjust the distances between the cones.

8. The combination with a conical settling tank, of a directing tube providing a central passage tapering toward the bottom of the tank and having liquid discharge areas from said central passage under successively increasing hydraulic heads.

9. The combination with a conical settling tank, of a directing tube providing a central passage terminating above the bottom of the tank and having successive liquid outlets into the tank under successively increasing hydraulic heads, said outlets discharging into zones between the sides of the tank and said tube decreasing in area from the top of the tank downward, thereby decreasing the velocities of the solutions as they flow upward.

10. The combination with a settling tank, of a launder to which said tank is secured comprising an inverted rolled channel, a perforated inner wall secured to the inner web of said channel, an outer wall projecting above the inner wall and secured to the outer flange of said channel, and a discharge pipe in the outer wall.

11. The combination with a conical settling tank, having steep sides; of a composite directing tube comprising superposed spaced cones and of general conical shape, differing in conicity from the tank, said directing tube having a central conical passage.

12. The combination with a conical tank; of a centrally arranged directing tube composed of vertically spaced cones whose discharge orifices decrease in size downward, and arranged to condense the solids flowing therethrough, said cones aranged with respect to one another to produce a decreased velocity flow between them under an increasing hydraulic head, and said tube arranged with respect to said tank to provide a decreasing upward liquid flow with a decrease of the hydraulic head.

In testimony that I claim the foregoing as my invention, I have signed my name.

HARRY R. CONKLIN.